(12) United States Patent
Schulz et al.

(10) Patent No.: US 8,672,796 B2
(45) Date of Patent: Mar. 18, 2014

(54) ADJUSTMENT DEVICE, IN PARTICULAR FOR A VEHICLE SEAT

(75) Inventors: Dirk Schulz, Remscheid (DE); Stefan Haida, Remscheid (DE)

(73) Assignee: Johnson Controls Technology Company, Holland, MI (US)

( * ) Notice: Subject to any disclaimer, the term of this patent is extended or adjusted under 35 U.S.C. 154(b) by 583 days.

(21) Appl. No.: 12/447,861

(22) PCT Filed: Oct. 30, 2007

(86) PCT No.: PCT/EP2007/009453
§ 371 (c)(1),
(2), (4) Date: Feb. 8, 2010

(87) PCT Pub. No.: WO2008/052761
PCT Pub. Date: May 8, 2008

(65) Prior Publication Data
US 2010/0139425 A1  Jun. 10, 2010

(30) Foreign Application Priority Data

Nov. 2, 2006 (DE) .......................... 10 2006 052 185
Apr. 12, 2007 (DE) .......................... 10 2007 017 617

(51) Int. Cl.
*F16H 3/44* (2006.01)
*F16D 67/00* (2006.01)
*B60N 2/02* (2006.01)

(52) U.S. Cl.
USPC ......... 475/323; 475/324; 192/223.2; 297/362

(58) Field of Classification Search
USPC .................. 475/323, 324; 192/223.2
See application file for complete search history.

(56) References Cited

U.S. PATENT DOCUMENTS

| 4,211,451 A | | 7/1980 | Shephard | |
|---|---|---|---|---|
| 5,025,902 A | * | 6/1991 | Imai et al. | 192/43 |
| 5,135,084 A | * | 8/1992 | Ito et al. | 192/38 |
| 5,558,293 A | | 9/1996 | Hirase et al. | |

(Continued)

FOREIGN PATENT DOCUMENTS

| DE | 3201309 A1 | 7/1983 |
|---|---|---|
| DE | 19718744 C1 | 11/1998 |

(Continued)

OTHER PUBLICATIONS

International Search Report for application No. PCT/EP2007/009453 mailed Feb. 5, 2008.
Written Opinion for application No. PCT/EP2007/009453 mailed May 14, 2009.

*Primary Examiner* — David D Le
*Assistant Examiner* — Colby M Hansen
(74) *Attorney, Agent, or Firm* — Fletcher Yoder P.C.

(57) ABSTRACT

An adjustment device is disclosed for carrying out at least one adjustment function, such as for a motor vehicle seat. The device includes a drive in the form of a planetary gear mechanism. The mechanism has a planet carrier and an output. The output is stopped by a brake device when the drive is not actuated. The planet carrier cooperates with the brake device to release the brake device.

15 Claims, 12 Drawing Sheets

(56) References Cited

U.S. PATENT DOCUMENTS

| | | |
|---|---|---|
| 5,586,631 A | 12/1996 | Benthin |
| 6,260,685 B1 | 7/2001 | Montanana |
| 6,279,714 B1 * | 8/2001 | Hsu .......................... 192/223.2 |
| 6,331,034 B1 * | 12/2001 | Specht ..................... 297/362.11 |
| 7,117,710 B2 * | 10/2006 | Kurita et al. ................. 72/379.2 |
| 2003/0200627 A1 | 10/2003 | Becker et al. |
| 2005/0245348 A1 | 11/2005 | Liu |
| 2008/0001458 A1 | 1/2008 | Hoshihara et al. |

FOREIGN PATENT DOCUMENTS

| | | |
|---|---|---|
| EP | 0751032 A1 | 1/1997 |
| EP | 1 359 051 A2 | 11/2003 |
| JP | 01-103436 | 4/1989 |
| JP | 2002-122158 | 4/2002 |
| WO | 2006011649 A2 | 2/2006 |

\* cited by examiner

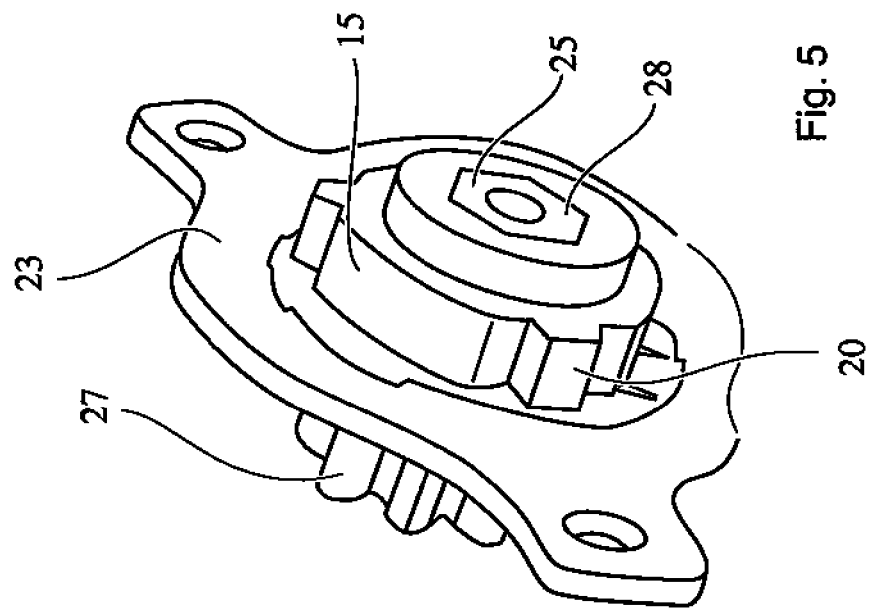
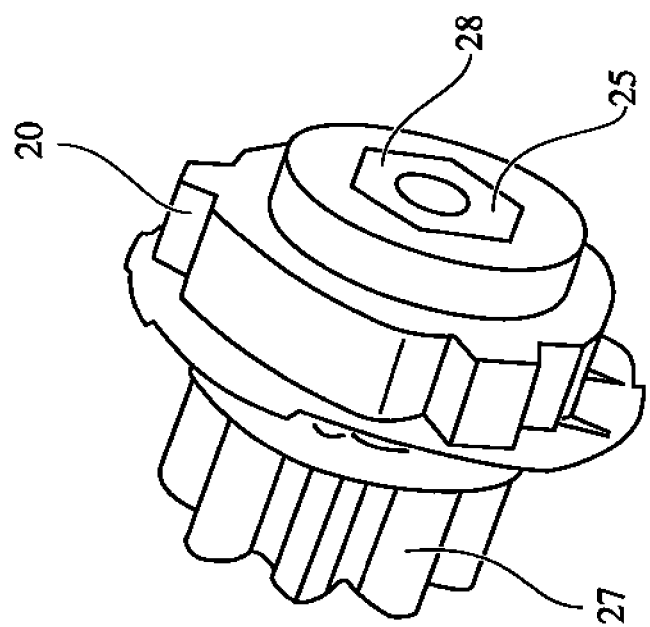

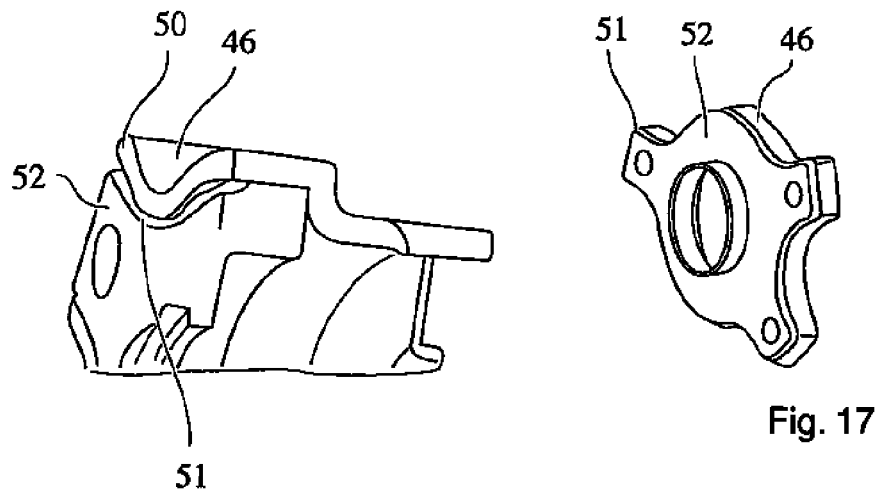
Fig. 17
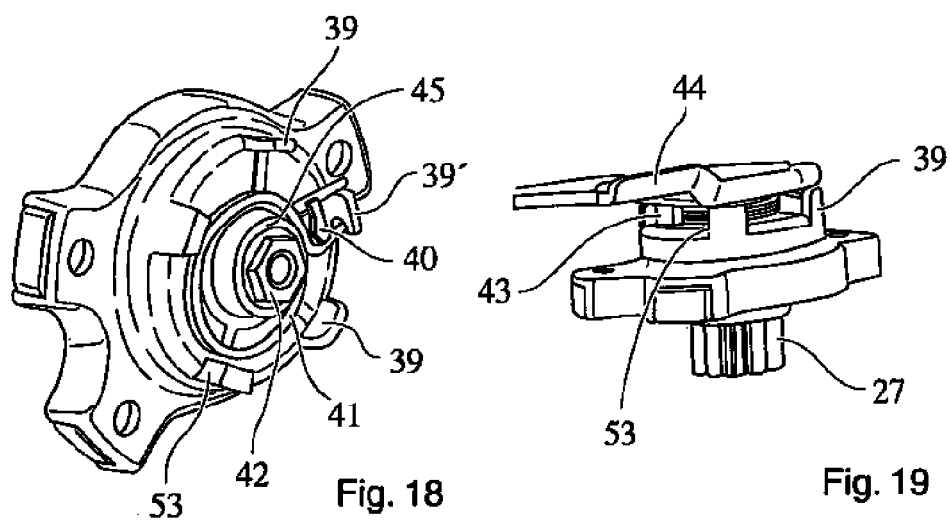
Fig. 18
Fig. 19
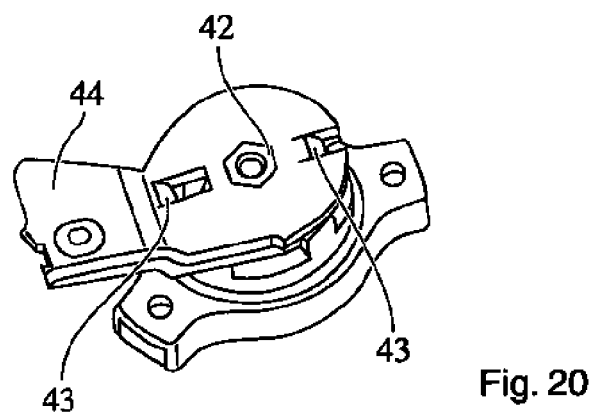
Fig. 20

ADJUSTMENT DEVICE, IN PARTICULAR FOR A VEHICLE SEAT

CROSS REFERENCE TO RELATED APPLICATIONS

This application claims priority from and the benefit of PCT Application No. PCT/EP2007/009453, filed on Oct. 30, 2007; German Patent No. DE 10 2006 052 185.4, filed on Nov. 2, 2006; and German Patent DE 10 2007 017 617.3, filed on Apr. 12, 2007; all entitled "Adjustment Device, In Particular for a Vehicle Seat", which are herein incorporated by reference.

BACKGROUND

The invention relates to an adjustment device, in particular for a vehicle seat, for carrying out at least one adjustment function, having a planetary gear mechanism, which has a drive and an output and a brake device, which keeps torques acting on the planetary gear mechanism at least substantially away from the output.

Such adjustment devices are, for example, known from U.S. Pat. No. 4,211,451, DE 32 01 309 as well as US 2005/0245348 A1, and are suitable, for example, for electrical or preferably manual actuation of a device for adjusting the height of a motor vehicle seat. In this connection, the adjustment device converts an input drive torque into a higher output torque, which is used for the angular adjustment of components connected thereto, for example the seat height adjuster. In order at least to reduce torques acting on the planetary gear mechanism from the drive unit, the adjustment devices comprise brake devices. The adjustment devices known from the prior art are, however, of relatively complicated design and/or difficult to mount.

It was, therefore, the object of the present invention to provide an adjustment device which does not have the drawbacks of the prior art.

SUMMARY

The object is achieved by an adjustment device for carrying out at least one adjustment function, in particular for adjusting a motor vehicle seat, having a drive in the form of a planetary gear mechanism, which has a planet carrier, and an output which is stopped by a brake device when the drive is not actuated, the planet carrier cooperating with the brake device such that said brake device is selectively releasable.

With the adjustment device according to the invention, any adjustments may be undertaken, for example, on a motor vehicle seat. For example, with the adjustment according to the invention, the height of the seat surface, the inclination of the backrest relative to the seat surface and the shape of the seat may be altered.

The adjustment according to the invention may be driven both manually and also by motor. The adjustment device according to the invention is of simpler design than adjustment devices according to the prior art and simpler to manufacture.

Torques which act on the planetary gear mechanism from the output, are at least partially, preferably entirely held back by the brake device. Preferably, the brake device acts in two rotational directions.

Preferably, the brake device comprises a brake ring and an inner ring, between which a gap is located in which at least one brake body is arranged.

Preferably, the brake bodies are arranged in pairs and respectively comprise a spring means which is arranged between the brake bodies.

The planetary gear mechanism preferably comprises at least two planet gears which are rotatably arranged about a sun gear and on a planet carrier. Preferably, said planet carrier has non-positive and/or positive connecting means, preferably projections or recesses which cooperate with the brake bodies in an unlocking manner. Particularly preferably, the planet carrier comprises a plurality of projections arranged in pairs. Preferably one respective intermediate space is present between two pairs of projections.

Preferably, extensions on the inner ring engage in the intermediate spaces with clearance.

Preferably, the inner ring on the side facing the rolling bodies at least partially comprises a drive geometry, particularly preferably a spiral geometry.

Preferably, the drive shaft is at least partially mounted in the output shaft.

A further subject according to the invention or a preferred subject of the present invention is an adjustment device for carrying out at least one adjustment function, in particular for adjusting a motor vehicle seat, having a drive and an output and a brake device, which keeps torques acting on the drive substantially away from the output, the bearing arrangement for the output and the brake device being arranged in a housing.

In this adjustment device, accordingly, a torque is forwarded from the drive to the output, but a torque acting on the output is stopped by a brake device.

According to the invention the bearing arrangement for the output, in particular the radial bearing thereof, and for the brake device, in particular the axial and radial bearing for the rolling bodies, is arranged in a housing. This results in a smaller spatial requirement and/or preferably only three rolling body pairs are required instead of five or six as previously.

Preferably, the housing comprises in its edge region a snap closure for a closure element. This snap closure is preferably produced by cold forming of the housing. With this snap closure, a closure element, for example a cover, is fastened to the housing. Optionally, the housing and the closure element may be connected to one another by additional connecting means, such as for example screws.

Preferably, the adjustment device comprises on the drive side a bearing surface for a handle, for example a lever. Such a bearing surface is, for example, a planar surface on which the handle may be supported.

Moreover, preferably, on the drive side projections are provided as stop surfaces for the handle. Between these projections and the handle a gap is present in normal operation. However, the handle may be supported on these projections if required. The projections are preferably arranged on a circular path about the bearing surface of the handle, at a uniform or non-uniform distance from one another. For example, the projections are arranged in the manner of teeth on a ring. Particularly preferably, at least one projection, preferably a plurality of projections, comprises a stop surface with which the freedom of movement of the handle may be restricted in one or two directions.

Preferably, within the projections a spring means is arranged which cooperates in a resettable manner with the handle. In particular, the handle is forced back by the spring means into its initial position irrespective of its rotational direction. As the spring means is arranged inside the projections, it is protected from external influences and also is not able to have any impact on third parties.

Preferably, a projection comprises a positive connecting means for the spring means, which fixes said spring means to the housing in at least one, preferably two directions.

Preferably, the device comprises a pretensioning means for the spring means such that said spring means is secured to the housing and/or no noise is produced.

Preferably, a drive means for the spring means is arranged on the handle. As a result of this measure, the spring means may preferably be tensioned in two directions. Particularly preferably, this drive means cooperates with the stop surfaces of the projections, in order to limit the movement of the handle.

DRAWINGS

The invention is described hereinafter with reference to FIGS. 1-21. These explanations are merely given by way of example and do not limit the general inventive idea. These explanations apply equally to all subjects of the present invention.

FIG. 4 shows the inner ring of the brake device as well as the output pinion.

FIG. 5 shows the inner ring according to FIG. 4 with the housing cover.

FIG. 17 shows the snap closure between the housing and the cover in two views.

FIG. 18 shows the drive side of the adjustment device according to the invention.

FIG. 19 shows the handle arranged on the device.

FIG. 20 shows a further view of the adjustment device with the handle.

DETAILED DESCRIPTION

Figure 1:
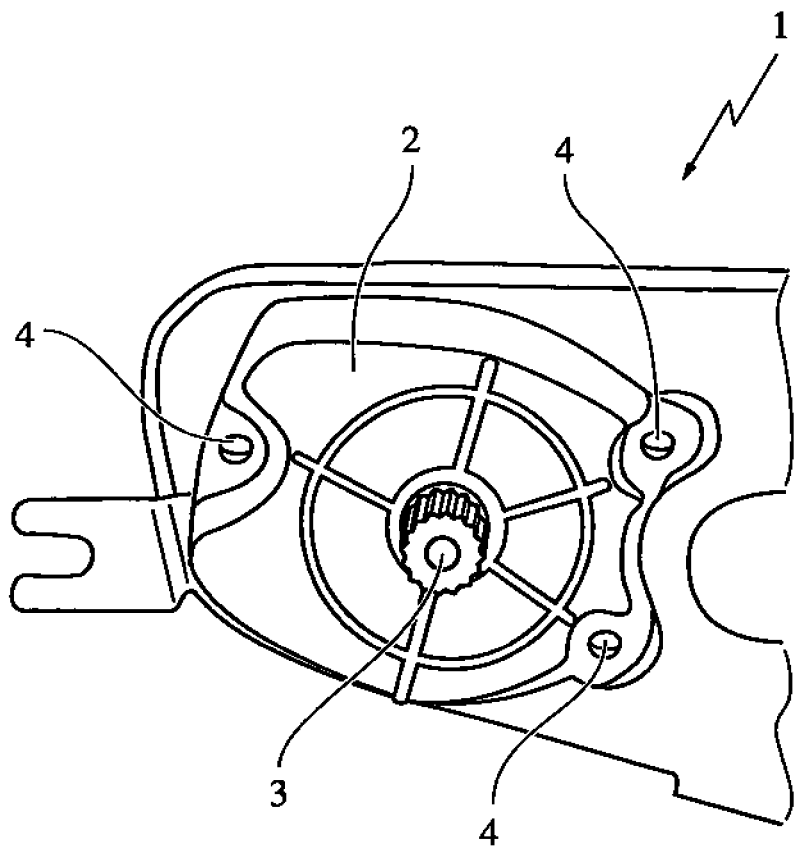
FIG. 1 shows the housing of the adjustment device.

The adjustment device 1, shown by way of example and schematically in the following figures, comprises a ribbed housing 2, for example made of plastics 2, from which the drive shaft 3 provided with a fine toothing and mounted in the housing 2 protrudes (FIG. 1). A hand wheel for manual actuation of the adjustment device 1 may be subsequently placed onto this toothing or a motor may be attached thereto. The housing 2 further comprises bores 4 for fastening the adjustment device 1, for example to the lateral support of the metal structure of a seat part.

Figure 2:
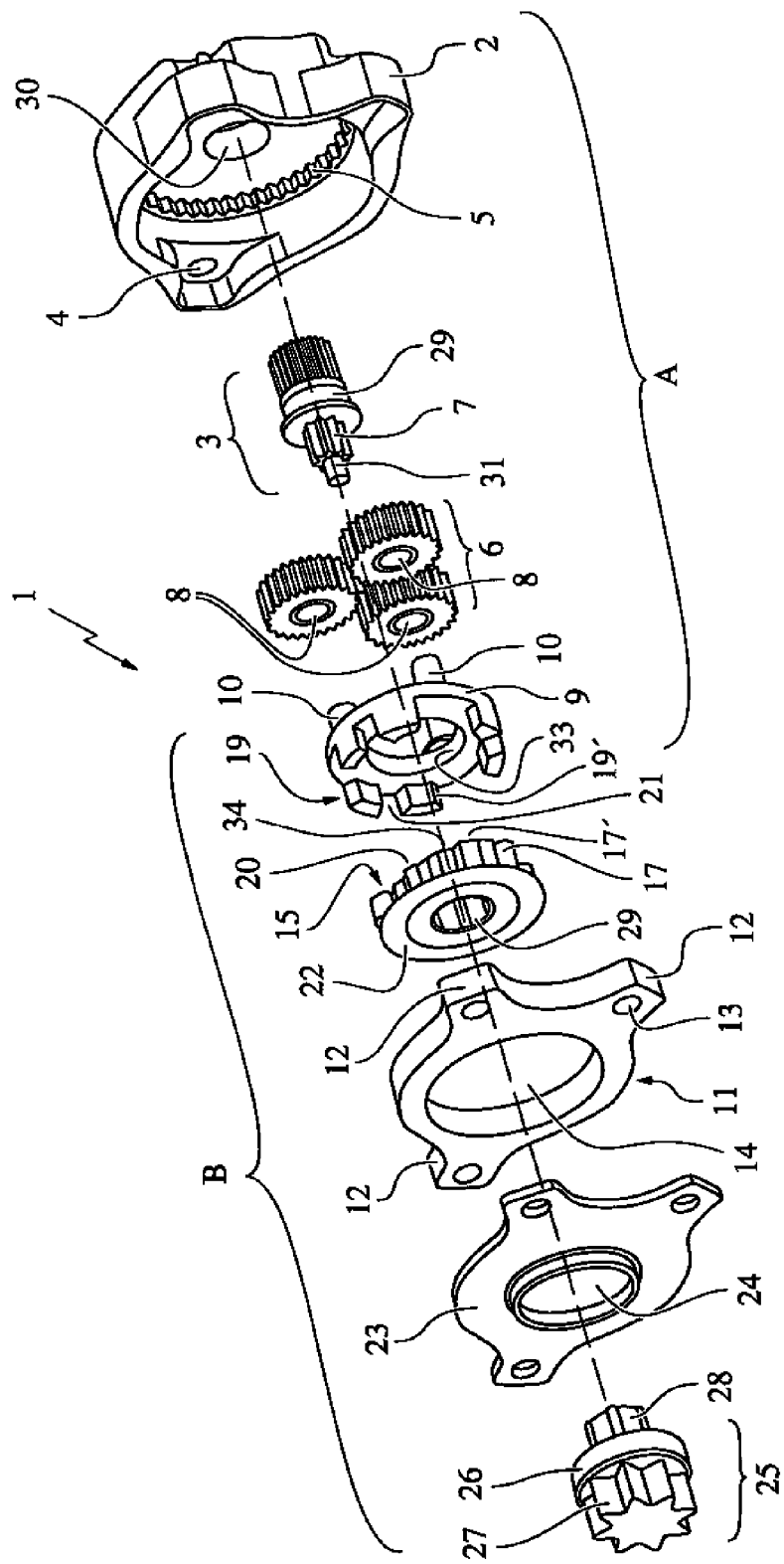
FIG. 2 shows an exploded view of the adjustment device according to the invention.
Figure 7:
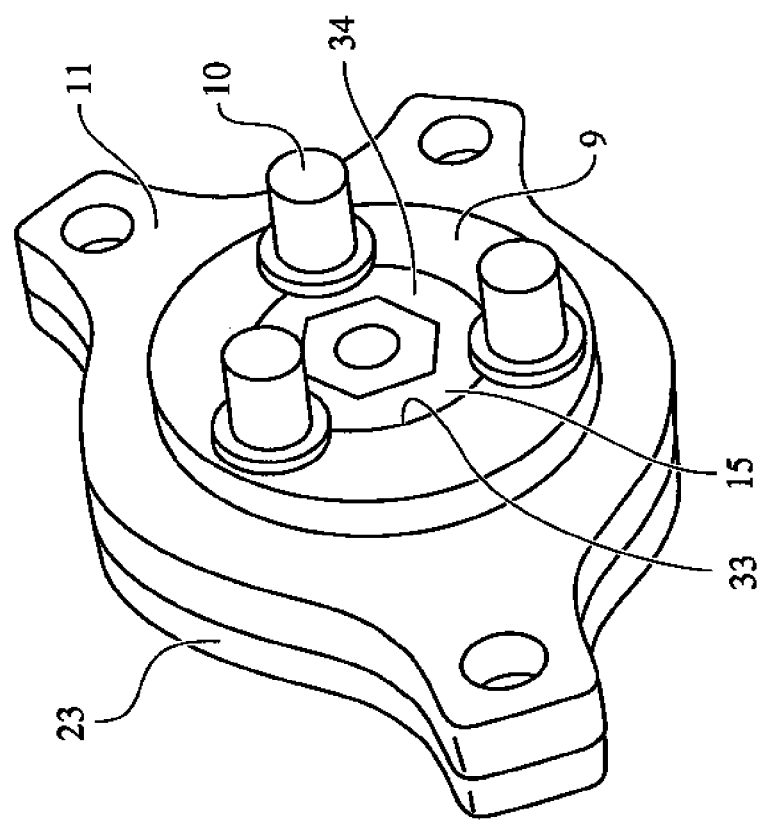
FIG. 7 shows the planet carrier on the brake device.
Figure 6:
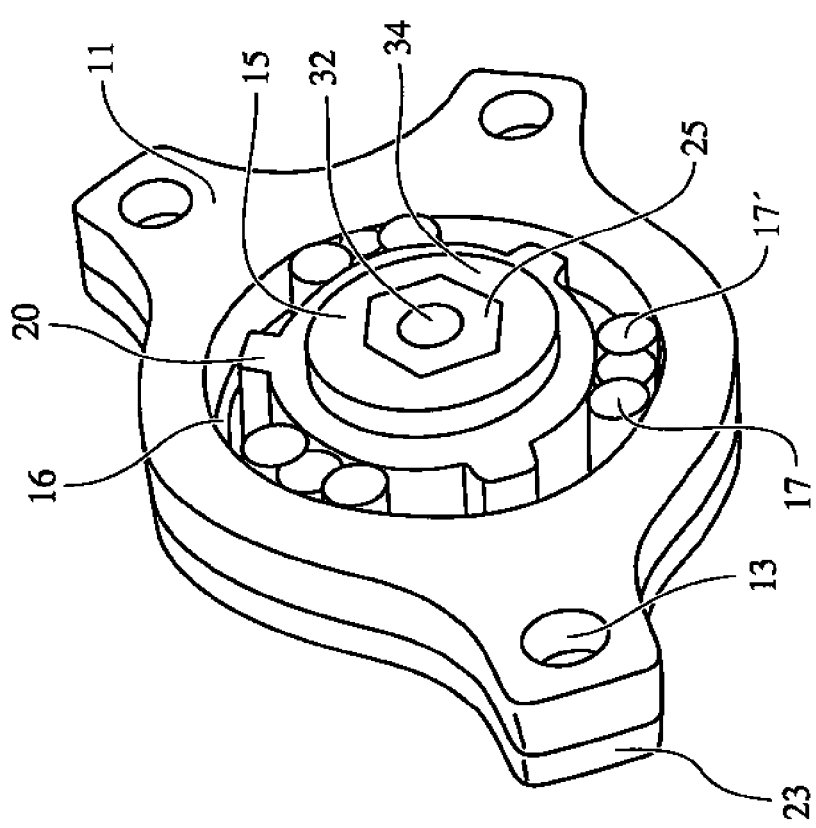
FIG. 6 shows a further view of the brake device with the brake ring and the brake bodies.
Figure 9:
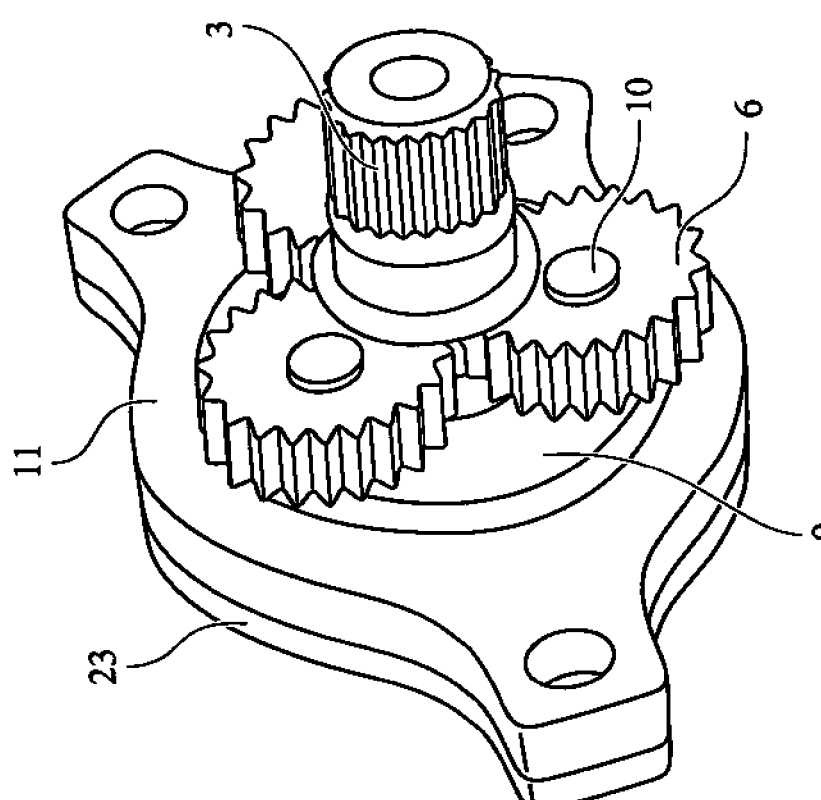
FIG. 9 shows the drive shaft for the planet gears.
Figure 8:
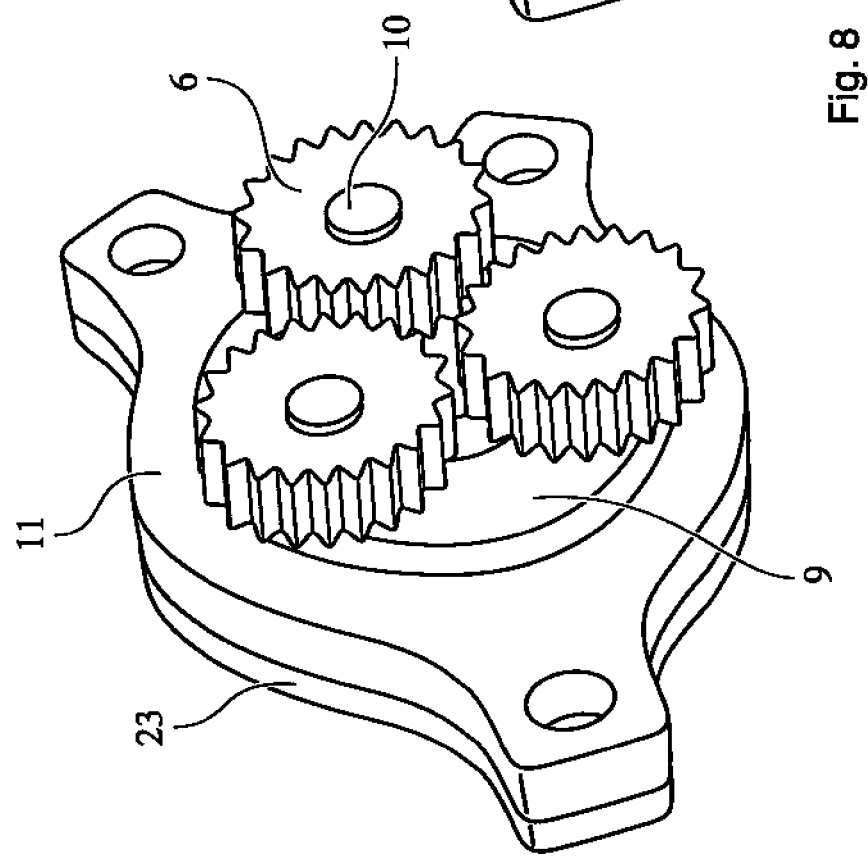
FIG. 8 shows the planet gears on the planet carrier.

As visible from FIG. 2, the housing 2 is provided on the inside with an inner toothing 5 extending coaxially to the drive shaft 3, in which three planet gear wheels 6 circulate about an outer toothing 7 of the drive shaft 3 protruding into the housing 2. With a rotation of the drive shaft 3, therefore, the axes 8 of the planet gear wheels 6 travel on a circular path in the housing 2 at a reduced rotational speed relative to the drive shaft 3. The drive shaft 3 may comprise a compensation means, for example a compensation ring, by which manufacturing tolerances are compensated, noise reduced and/or a tangible rotational resistance is produced. The rotation of the drive shaft 3 is undertaken by an annular planet carrier 9, which may be rotated coaxially to the drive shaft 3. The planet carrier comprises axial pins 10 protruding from its axial surface parallel to its rotational axis in the direction of the planet gear wheels 6.

The planet gear wheels 6 are rotatably mounted on these axial pins 10. The above-described components (sub-assembly A) thus form a planetary gear mechanism. The planetary gear mechanism is rotatable in two rotational directions.

The planet carrier 9 is the interface with a free-running type brake device (sub-assembly B) which is intended to keep torques acting on the adjustment device 1 from the planetary gear mechanism (sub-assembly A), as fully as possible away from the output side. These torques may act in two rotational directions. The sub-assembly B includes a brake ring 11 stamped out of sheet steel which comprises outwardly extending tabs 12. The brake ring 11 is inserted into the housing 2 of complementary shape, bores 13 in the tabs 12 are congruent with the bores 4 of the housing 2. The brake ring 11 is, moreover, provided with a circular recess 14, which extends coaxially to the drive shaft 3 and receives the inner ring 15 of the brake device.

In the gap 16 between the brake ring 11 and the inner ring 15 (see FIG. 3) cylindrical rolling bodies 17, 17' are arranged in pairs, the rolling bodies 17, 17' of each pair being spread apart by an elastomeric body 18 located therebetween and acting as spring means. The person skilled in the art recognizes, however, that said spring means may also be any other spring means, for example a spiral spring. The outer periphery of the inner ring 15 is designed such that the gap 16 in the region of each elastomeric body 18 is greater than the diameter of the same rolling body 17, 17', but narrows away from the elastomeric body 18 to a depth which is smaller than the diameter of the rolling bodies 17, 17'. Each pair of rolling bodies 17, 17' is thus trapped in part of the periphery of the gap 16. With the rotation of the inner ring 15 relative to the brake ring 11, one respective rolling body 17 of a pair is clamped in the narrowing region of the gap 16, due to the spiral geometry 36 on the inner ring 15 toward the rolling body 17, 17' so that a further rotation is prevented. With the rotation of the inner ring 15 in the opposite direction, the clamping takes place by the other rolling body 17' of the pair. Thus it is prevented that significant torques, which occur in an accident, are transmitted to the planetary gear mechanism.

The planet carrier 9, on its side remote from the sub-assembly A, is provided with pairs of projections 19, 19', which protrude between the pairs of rolling bodies 17, 17' into the gap 16. The intermediate spaces 21 between each pair of projections 19, 19' cooperate, with clearance, with extensions 20 on the outer periphery of the inner ring 15, whilst the surfaces of the projections 19, 19' remote from the intermediate spaces 21, during a rotation of the inner ring 15, act alternately on the rolling bodies 17, 17'. As a result, with the rotation of the inner ring 15, the clamped rolling bodies 17, 17' are initially released, the clearance between the projections 19 of each pair and the extensions 20 being used up. As soon as each projection 19 bears against the associated extension 20, a torque from the planet carrier 9 is directly transmitted to the inner ring 15. With a rotation in the opposite direction, this takes place accordingly by contact between the extensions 20 and the projections 19'.

On the inner ring 15, a thrust washer 22 is arranged on the side remote from the sub-assembly A, which rotates with the inner ring 15 and bears against the housing cover 23. The outer contour of the housing cover 23 which may be latched to the housing 2 is configured to be congruent with the brake ring 11, so that said outer contour may be inserted in the same manner into the housing 2. The housing cover 23 is provided with a through-hole 24 aligned coaxially with the drive shaft 2, in which the output shaft 25 is mounted. In this case, the housing cover is preferably made from a metallic material. The housing cover may, however, be made from plastics, in the case where it is merely required as protection. The housing cover is attached positively and/or non-positively to the premounted unit, for example screwed or riveted. Preferably, the cover 23, however, is attached by a rapid closure to the housing 4, for example a snap closure. The output shaft 25 extending coaxially to the drive shaft 3 has a cylindrical region 26 suitable for mounting, which the output pinion 27 outwardly adjoins. On the opposing side, the output shaft 25 is provided with a polygonal profile 28, which engages without clearance in a recess 29 in the inner ring 15 of complementary design. The person skilled in the art recognizes that the output shaft 25 and the inner ring 15 may be designed in one piece.

When actuating the adjustment device 1, the drive torque is thus transmitted via the drive shaft 3, the planet gear wheels 6 and the planet carrier 9 to the inner ring 15 and from there to the output pinion 25. A torque acting from the output side is transmitted via the output shaft 25 to the inner ring 15, and subsequently by the clamping of the rolling bodies 17 or 17' absorbed by the brake ring 11. The planet carrier 9, the planet gear wheels 6 and the housing 2 are, as a result, unloaded and may accordingly be dimensioned to be thinner.

Figure 11:
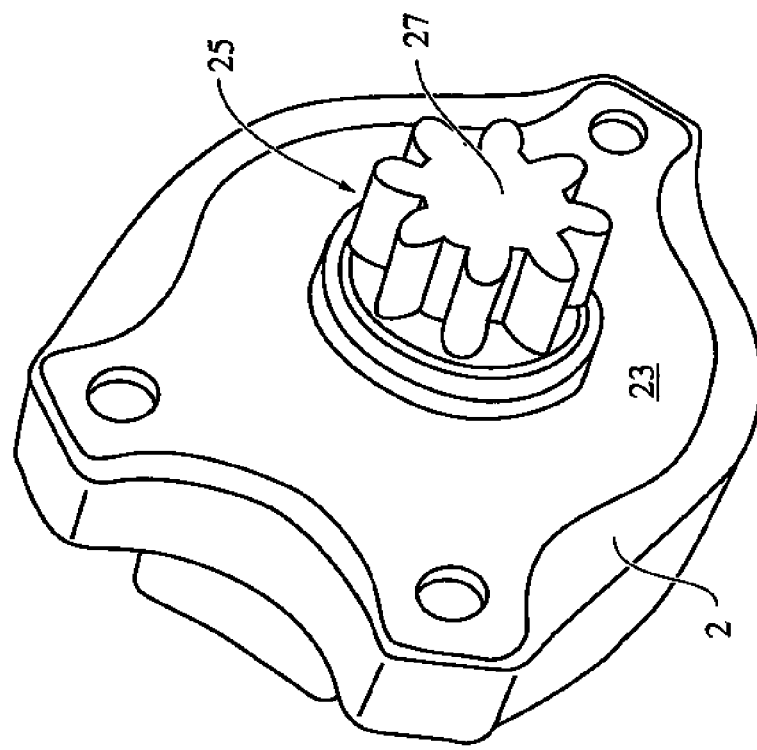
FIG. 11 shows the housing from the output side.
Figure 10:
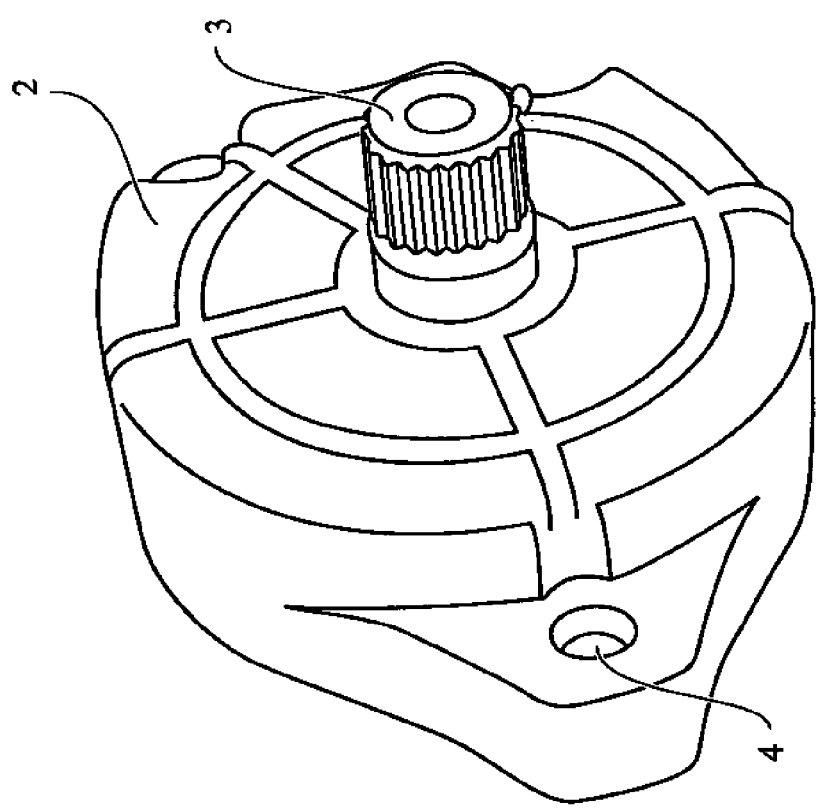
FIG. 10 shows the housing from the drive side.

FIGS. 4 to 9, show different configurations of components of the adjustment device 1 relative to one another, other respective components being omitted. FIGS. 10 and 11 show a front or rear view of the premounted adjustment device 1.

Figure 3:
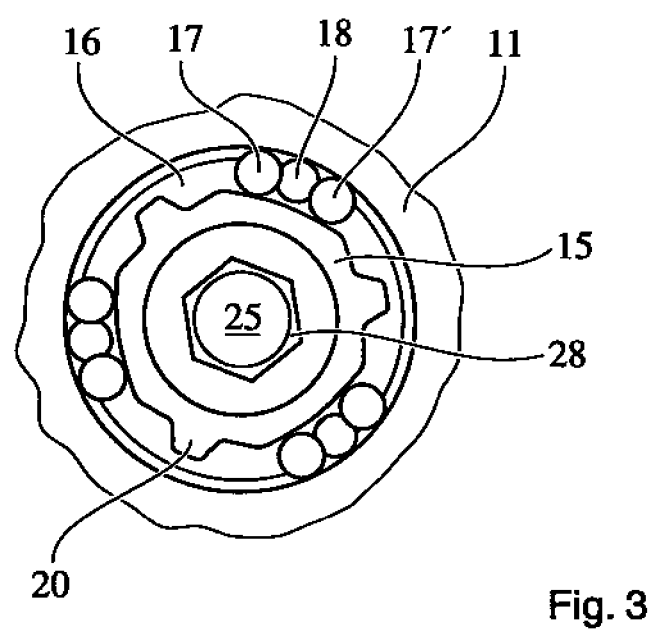
FIG. 3 shows the brake device.
Figure 12:
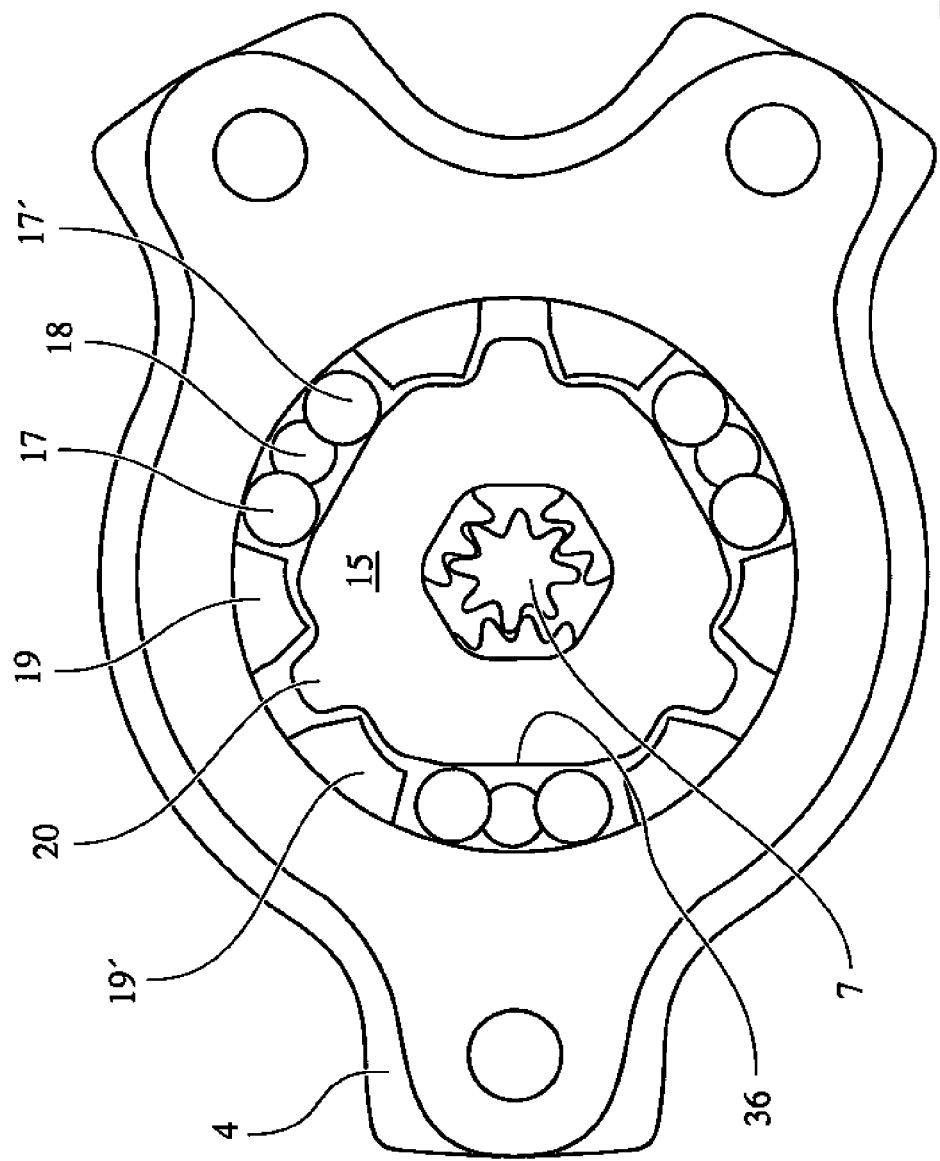
FIG. 12 shows a further view of the brake device.

FIG. 12 shows a further view of the brake device according to FIG. 3. It may be seen clearly how the projection 20 engages between two respective positive and/or non-positive connecting means 19, 19'.

Figure 13:
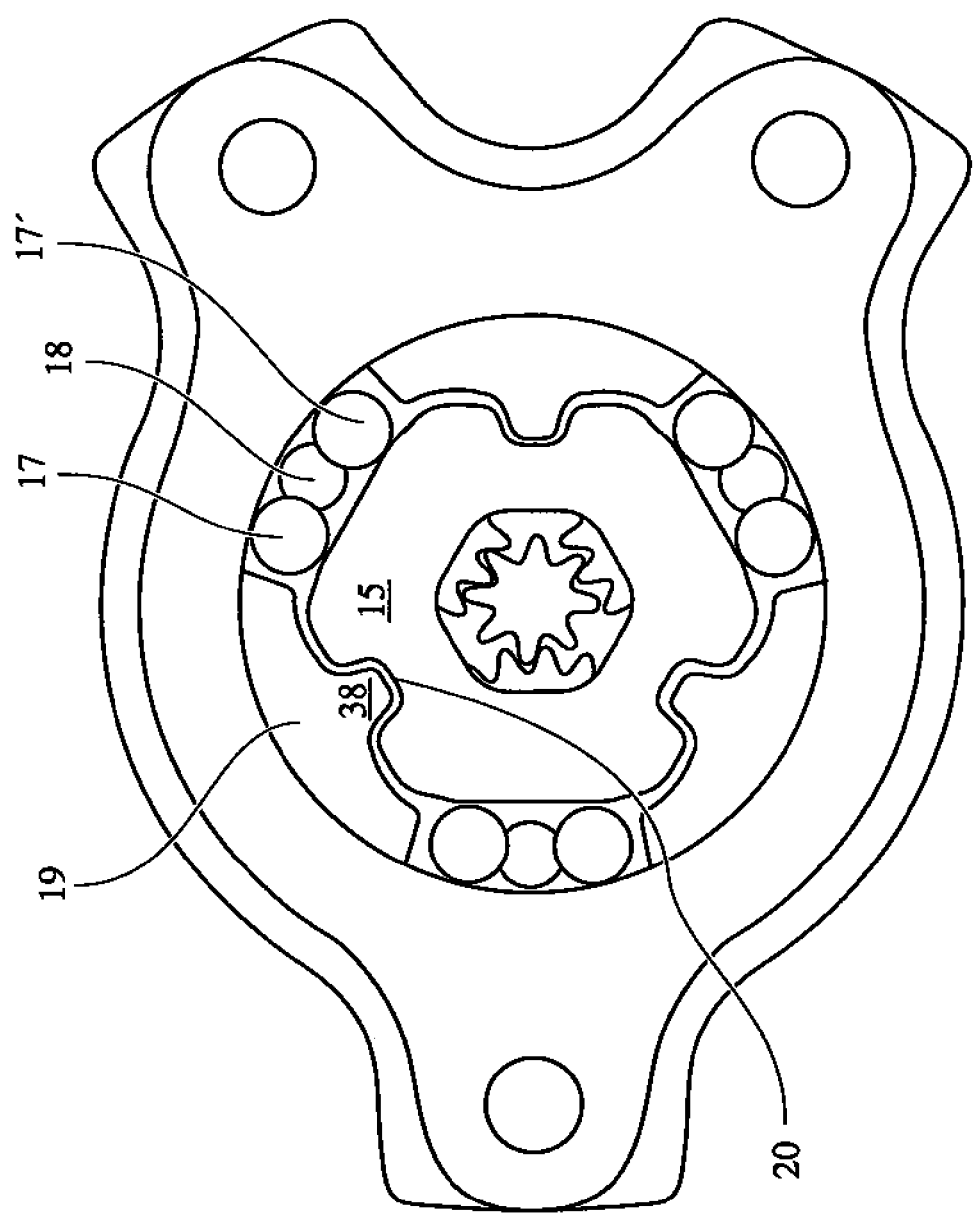
FIG. 13 shows an alternative embodiment of the brake device according to FIG. 12.

FIG. 13 shows a further embodiment of the brake device. In this present case, the positive and/or non-positive connecting means 19 is designed in one piece and comprises a projection, for example a lug 38 which cooperates positively and/or non-positively in a recess 20 on the inner ring 15 and respectively drives the non-positive means.

Figure 14:
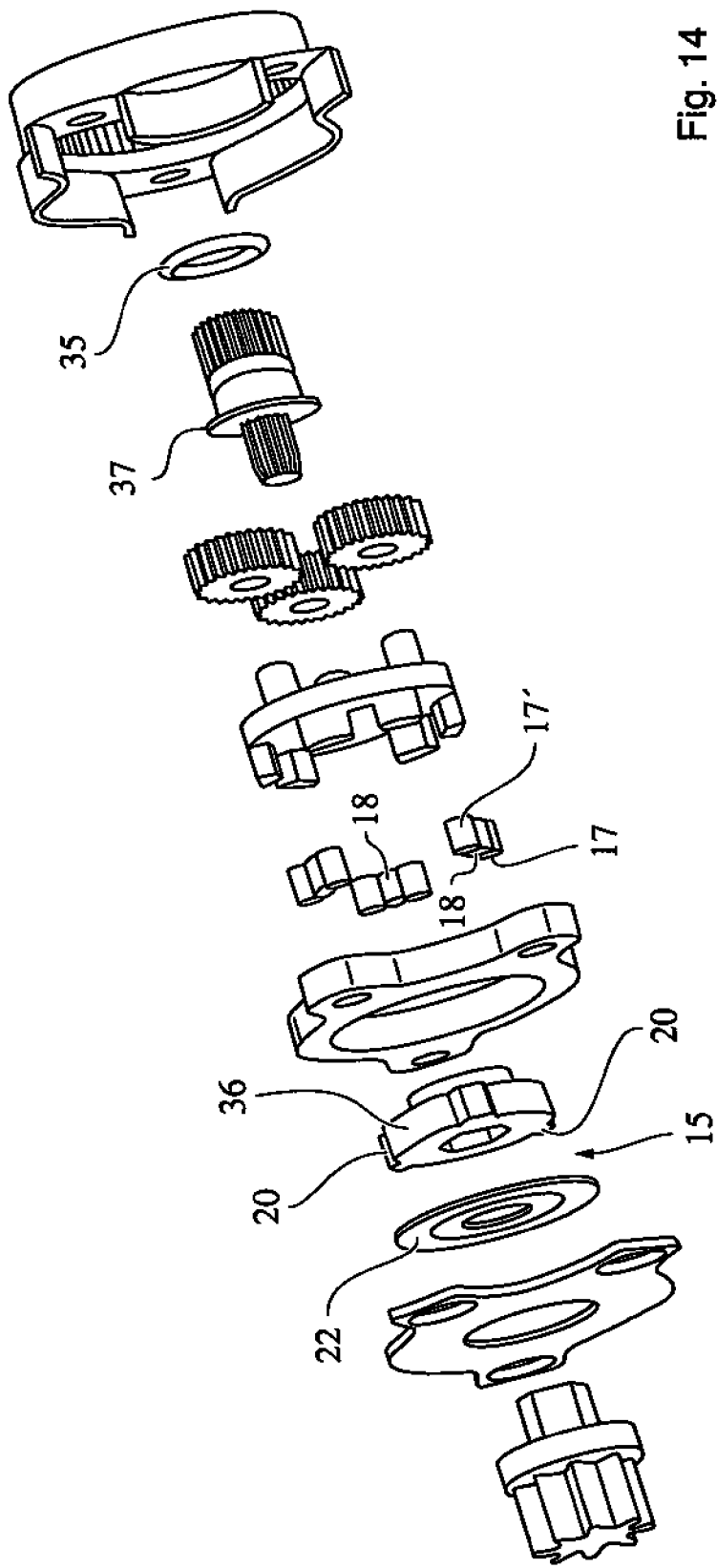
FIG. 14 shows a further exploded view of the adjustment device according to the invention.

FIG. 14 shows a further view of the exploded view according to FIG. 2. The compensation ring 35 is clearly visible, which bears against the shoulder 37 and encloses the drive shaft 3. Furthermore, the spiral geometry 36 may be seen on the outside of the inner ring. Otherwise, reference is made to the embodiments of FIG. 2.

The bearing arrangement of the individual components of the adjustment device 1 is designed as follows: The drive shaft 3 is mounted via a cylindrical region 29 located on the other side of the outer toothing 7, in a bore 30 in the housing 2 as well as via a pin 31 protruding on this side of the outer toothing 7, formed integrally in a bore 32 in the output pinion 25. The planet carrier 9 is mounted with its inner periphery 33 on the outer radial surface of an annular projection 34 of the inner ring 15. The output shaft 25 is mounted via the region 26 in the housing cover 23 and, moreover, via the polygonal profile 28 in the inner ring 15. The inner ring 15 is, in turn, aligned via the rolling bodies 17, 17' relative to the brake ring 11.

Figure 15:
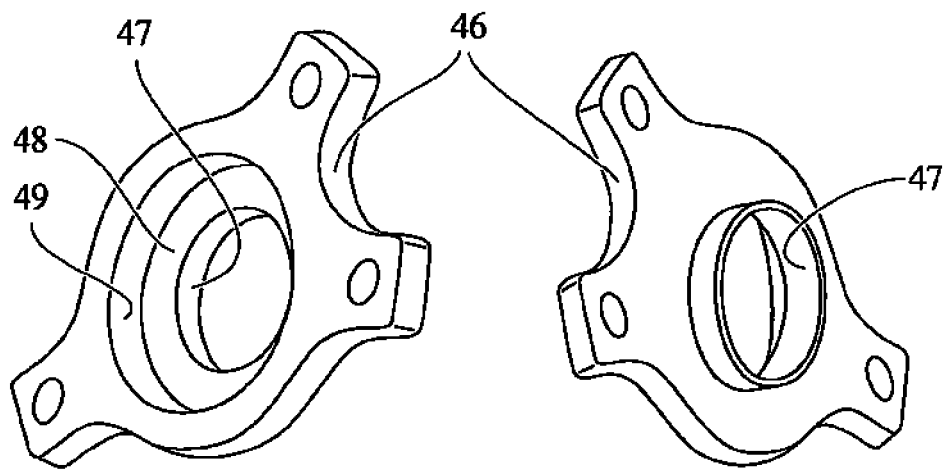
FIG. 15 shows two views of the housing.
Figure 16:
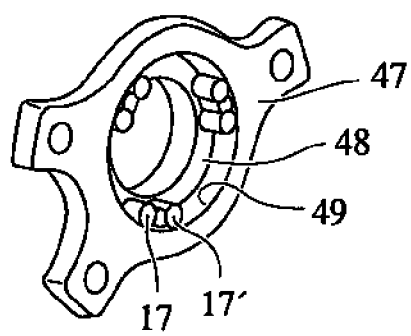
FIG. 16 shows the cooperation of the rolling bodies with the housing.

FIG. 15 shows the housing 46 of the adjustment device according to the invention. This housing has a radial bearing surface 47 for the output pinion as well as an axial bearing surface 48, as well as a radial bearing surface 49 for the rolling bodies 17, 17'. By the compact design of the housing it is possible, as shown in FIG. 16, to provide an adjustment device with only three rolling body pairs 17, 17' and with these three rolling body pairs it is possible to absorb and to convey to the housing all forces and torques which occur.

FIG. 17 shows the housing 46 which is provided with a cover 52. On the edge of the housing 46, a connecting means 50 has been produced by cold forming which cooperates in the manner of a clip with the cover 52, which comprises a peripheral edge 51. By this snap closure it is possible to arrange the cover 52 on the housing 46 without the use of tools.

In FIG. 18, the drive side of the adjustment device is shown. Said adjustment device has a bearing surface 45 on which a handle (not shown) may be positioned, which is fastened by means of the nut 42 to a shaft (not shown) of the adjustment device. Moreover, the drive side of the adjustment device according to the invention has five projections 39, between which and the handle a small gap is present in normal operation, but which may serve as a support for the handle in order to avoid an overloading of the bearing surface 45 or an undesired torque transmission onto the adjustment device according to the invention. In the present case, the projections 39 are arranged at equal intervals on a circular ring around the bearing surface 45 for the handle. This, however, does not have to be the case. Inside this ring of projections 39, a second spring 41 is arranged which cooperates in a resettable manner with the handle. The projections 39 represent protection for the second spring 41, but also prevent a vehicle passenger from becoming injured on the spring. One of the projections 39' has a notch 54 which secures the second spring 41 in at least two directions. Moreover, the adjustment device according to the invention comprises a pretensioning means 40 which firstly pretensions the second spring 41 but also serves for further fastening of the spring to the housing of the adjustment device.

FIG. 19 shows the handle 44 arranged on the adjustment device. In the present case, it is a lever which may be moved in two rotational directions. Said lever bears against the bearing surface 45 and is fastened by means of the bolt 42 to the adjustment device. The drive means 43 are formed from the handle which, with a movement of the handle, move on the circular ring on which the projections are arranged. The drive means shown in FIG. 19 cooperate with the bearing surface 53 of the projections 39 and define the adjustability of the handle 44 in two directions.

FIG. 20 shows a further view of the handle in cooperation with the adjustment device according to the invention. From this view it may be seen that two drive means 43 are formed from the handle 44. Whilst the left-hand drive means has the function explained with reference to FIG. 19, the right-hand drive means cooperates with the legs of the second spring 41, and drives one of these legs depending on the rotational direction and, as a result, tensions the second spring 41. As soon as the handle is released, the second spring 41 resets the handle into its original position.

Figure 21:
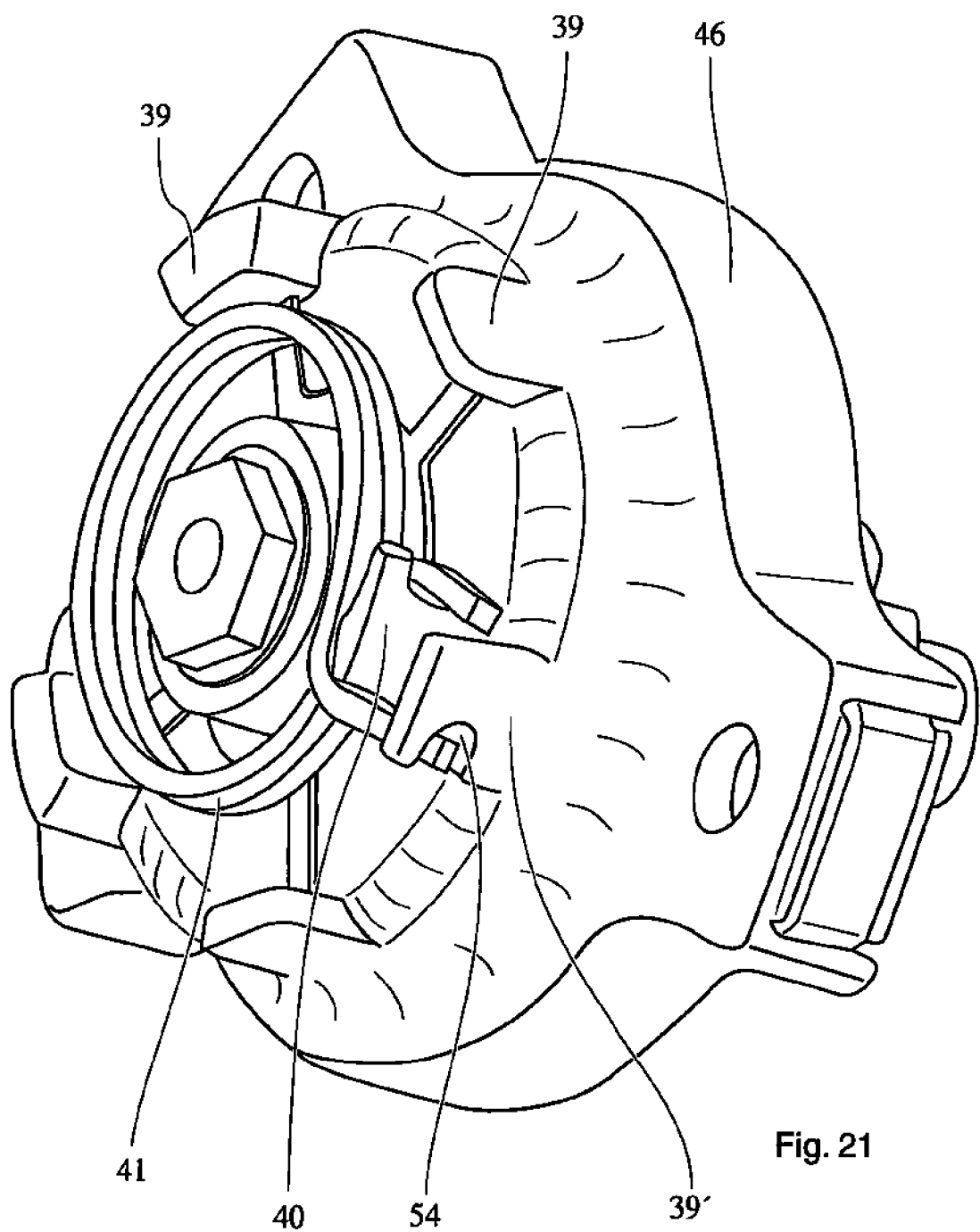
FIG. 21 shows a three-dimensional view of the drive side of the adjustment device according to the invention.

FIG. 21 shows a further view of the drive side of the adjustment device according to the invention. The positive connecting means 54 which receives a leg of the second spring 41 may be seen clearly. Moreover, it may be seen that the pretensioning means not only pretensions the second spring 41 but also secures it against removal.

The adjustment device shown in FIGS. 15 to 21 is used, in particular, for adjusting the height of the seating surface of a motor vehicle seat. The person skilled in the art recognizes that a further free-wheel must be arranged within the housing which, when resetting the handle by the second spring means 41, prevents a torque from being exerted on the drive of the adjustment device.

The invention claimed is:

1. An adjustment device for adjusting a motor vehicle seat, comprising:
    a drive in the form of a planetary gear mechanism, wherein the drive comprises a planet carrier and an output shaft configured to be stopped by a brake device when the drive is not actuated, the planet carrier comprising a plurality of projections configured to cooperate with the brake device such that the brake device is selectively releasable, and wherein the brake device comprises a brake ring and an inner ring forming a gap between the brake ring and the inner ring, a pair of rolling bodies and the plurality of projections of the planet carrier being arranged within the gap, and a spring being arranged between the pair of rolling bodies, the spring being configured to limit a transfer of torque between the brake device and the planet carrier.

2. The adjustment device as claimed in claim 1, wherein the brake device acts in two rotational directions.

3. The adjustment device as claimed in claim 1, wherein the planet carrier comprises means for cooperating with the pair of rolling bodies in an unlocking manner.

4. The adjustment device as claimed in claim 3, wherein the plurality of projections of the planet carrier are arranged in pairs, and wherein between two pairs of projections one respective intermediate space is present.

5. The adjustment device as claimed in claim 4, wherein extensions on the inner ring engage in the intermediate spaces with clearance.

6. The adjustment device as claimed in claim 5, wherein the brake device is configured so that rotation of the inner ring relative to the brake ring drives the pair of rolling bodies toward a narrowing portion of the gap to block further rotation of the inner ring.

7. The adjustment device as claimed in claim 1, comprising a drive shaft mounted at least partially in the output shaft.

8. An adjustment device for adjusting a motor vehicle seat, comprising;
    a drive comprising a planet carrier, wherein the planet carrier comprises a plurality of projections;
    an output;
    a brake device configured to direct torques acting on the drive substantially away from the output; and
    a bearing arrangement for the output and the brake device, wherein the bearing arrangement is arranged in a housing;
    wherein the brake device comprises a brake ring and an inner ring forming a gap between the brake ring and the inner ring, a pair of rolling bodies and the plurality of projections of the planet carrier being arranged within the gap, and a spring being arranged between the pair of rolling bodies, and wherein the spring is configured to limit a transfer of torque between the brake device and the planet carrier.

9. The adjustment device as claimed in claim 8, wherein the housing comprises a snap closure for closing the housing.

10. The adjustment device as claimed in claim 8, wherein the drive comprises a bearing surface.

11. The adjustment device as claimed in claim 10, wherein the drive comprises a drive side having projections configured to be stop surfaces.

12. The adjustment device as claimed in claim 11, wherein a second gap is formed by the projections.

13. The adjustment device as claimed in claim 11, wherein at least one of the projections is configured to couple a second spring to the at least one of the projections.

14. The adjustment device as claimed in claim 13, comprising a pretensioning device configured to apply tension to the second spring.

15. The adjustment device as claimed in claim 13, comprising a handle configured to rotate, to apply tension to the second spring, and to remove tention from the second spring.

* * * * *